(12) United States Patent
Takei et al.

(10) Patent No.: US 11,926,273 B2
(45) Date of Patent: Mar. 12, 2024

(54) HYDRAULIC CIRCUIT FOR VEHICLE DRIVING DEVICE

(71) Applicant: Honda Motor Co., Ltd., Tokyo (JP)

(72) Inventors: Hiroshi Takei, Tokyo (JP); Hirotake Omoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 17/903,041

(22) Filed: Sep. 6, 2022

(65) Prior Publication Data

US 2023/0127235 A1 Apr. 27, 2023

(30) Foreign Application Priority Data

Oct. 25, 2021 (JP) .................................. 2021-173659

(51) Int. Cl.

| *F16D 25/10* | (2006.01) |
| *B60R 16/08* | (2006.01) |
| *F15B 13/02* | (2006.01) |
| *F15B 19/00* | (2006.01) |
| *F16H 57/04* | (2010.01) |

(52) U.S. Cl.
CPC .............. *B60R 16/08* (2013.01); *F15B 13/02* (2013.01); *F15B 19/005* (2013.01); *F16D 25/10* (2013.01); *F16H 57/0413* (2013.01); *F16H 57/0435* (2013.01); *F16H 57/0439* (2013.01); *F16H 57/0476* (2013.01)

(58) Field of Classification Search
CPC .............. F16D 27/01; F16D 2011/002; F16H 57/0476; F16H 57/0413
See application file for complete search history.

(56) References Cited

U.S. PATENT DOCUMENTS

| 9,847,698 B2 | 12/2017 | Yoshinori et al. | |
| 2006/0223670 A1* | 10/2006 | Nishikawa | ............... B60K 6/44 |
| | | | 123/196 R |
| 2017/0210315 A1* | 7/2017 | Nakajima | ............... F16N 7/385 |
| 2018/0241288 A1* | 8/2018 | Murakami | ............. H02K 5/132 |

FOREIGN PATENT DOCUMENTS

| JP | H04109027 | | 4/1992 | |
| JP | 2003102147 | | 4/2003 | |
| JP | 2014077461 | | 5/2014 | |
| JP | 2014077461 | A * | 5/2014 | |
| JP | 2014110705 | | 6/2014 | |
| JP | 2016073163 | | 5/2016 | |
| JP | 2020156204 | | 9/2020 | |
| JP | 2021118628 | A * | 8/2021 | ............... B60K 1/00 |

OTHER PUBLICATIONS

Office Action of Japan Counterpart Application, with English translation thereof, dated Mar. 14, 2023, pp. 1-8.

* cited by examiner

*Primary Examiner* — Stacey A Fluhart
(74) *Attorney, Agent, or Firm* — JCIPRNET (57) ABSTRACT

A hydraulic circuit for a vehicle driving device includes an oil pump, a clutch oil passage, a cooling oil passage, a pressure regulating valve, and a shift valve. The cooling oil passage guides oil to a cooled portion of a vehicle. Supply of oil to the clutch oil passage and the cooling oil passage is switched by switching of the pressure regulating valve and the shift valve. The cooling oil passage includes: a shaft center cooling oil passage which supplies cooling oil to a shaft center of a rotation shaft of an electric motor mounted on the vehicle; and a cooling oil passage shift valve which switches presence/absence of supply of oil to the shaft center cooling oil passage.

6 Claims, 5 Drawing Sheets

| | Hydraulic circuit state (traveling mode) | First solenoid valve | Second solenoid valve | Third solenoid valve | Shaft center lubrication of first electric motor |
|---|---|---|---|---|---|
| (a) | ECVT mode | Off | Off | Off | Yes |
| (b) | ECVT (shaft center lubrication cut) mode | On | Off | Off | No |
| (c) | Clutch engagement preparation mode | Off | Off | On | Yes |
| (d) | Clutch engagement high mode | On | Off | On | No/Yes |
| (e) | Clutch engagement low mode | Off | On | On | Yes |

HYDRAULIC CIRCUIT FOR VEHICLE DRIVING DEVICE

CROSS-REFERENCE TO RELATED APPLICATION

This application claims the priority benefit of Japan application serial no. 2021-173659, filed on Oct. 25, 2021. The entirety of the above-mentioned patent application is hereby incorporated by reference herein and made a part of this specification.

BACKGROUND

Technical Field

The disclosure relates to a hydraulic circuit for a vehicle driving device, and specifically, to a hydraulic circuit for a vehicle driving device including a cooling oil passage for guiding oil to a cooled portion in addition to a clutch oil passage connected to an oil chamber of a clutch provided in a power transmission path.

Related Art

Conventionally, as a hydraulic circuit for a driving device mounted on a vehicle, for example, a hydraulic circuit shown in Patent Document 1 (Japanese Patent Application Laid-Open No. 2014-77461) has been disclosed. The hydraulic circuit of Patent Document 1 includes: an oil pump driven by an engine; a clutch oil passage connected to an oil chamber of a clutch; a cooling oil passage for guiding oil to a cooled portion; a pressure regulating valve which regulates a pressure of oil discharged from the oil pump; and a shift valve which switches a path of the oil regulated by the pressure regulating valve. The hydraulic circuit is configured to switch supply of oil to the clutch oil passage and the cooling oil passage by switching of the pressure regulating valve and the shift valve. Then, in the above hydraulic circuit, the cooling oil passage supplies cooling oil to an electric motor (traction motor) for driving the vehicle and an electric motor (generator) for power generation.

The cooling oil passage included in the hydraulic circuit described in Patent Document 1 is a structure which constantly cools the stator and the rotor of the electric motor using oil cooled by an air-cooled type oil cooler (cooling device). However, in this structure, since cooling oil for cooling the rotation shaft of the electric motor is constantly supplied, it is not possible to sufficiently reduce the operating resistance of the vehicle driving device and the power transmission device resulting from the oil flowing through the hydraulic circuit and the cooling oil passage, which may hinder the improvement of fuel efficiency of the vehicle. In addition, with the air-cooled type oil cooler constantly cooling the oil, the rise in oil temperature may be suppressed more than necessary. As a result, the resistance (friction) resulting from the oil flowing through the hydraulic circuit and the cooling oil passage continues to be relatively high, which may also hinder the improvement of fuel efficiency of the vehicle.

SUMMARY

A hydraulic circuit for a vehicle driving device according to an embodiment of the disclosure includes: an oil pump (OP1, OP2) which discharges oil; a clutch oil passage (L31, L32) connected to an oil chamber of a clutch (21, 22) provided in a power transmission path which transmits power from a power source (10) of a vehicle to driving wheels (20); a cooling oil passage (L1) for guiding oil to a cooled portion (41) of the vehicle; a pressure regulating valve (61) which regulates a pressure of oil discharged from the oil pump (OP1, OP2); and a shift valve (81, 82, 83) which switches a path of the oil regulated by the pressure regulating valve (61). Supply of oil to the clutch oil passage (L31, L32) and the cooling oil passage (L1) is switched by switching of the pressure regulating valve (61) and the shift valve (81, 82, 83). The cooling oil passage (L1) includes: an shaft center cooling oil passage (L12) which supplies cooling oil to a shaft center of a rotation shaft of an electric motor (11) mounted on the vehicle; and a cooling oil passage shift valve (84) which switches presence/absence of supply of oil to the shaft center cooling oil passage (L12). Herein, the electric motor (11) may be a driving electric motor which transmits power to the driving wheels (20) of the vehicle.

According to the hydraulic circuit for a vehicle driving device according to the disclosure, since oil is selectively supplied to the shaft center cooling oil passage which supplies cooling oil to the shaft center of the rotation shaft of the electric motor by switching of the cooling oil passage shift valve, compared to the hydraulic circuit of the conventional configuration, without adding components such as a new solenoid valve for switching the shift valve of the hydraulic circuit, cooling oil can be supplied only when necessary to the shaft center of the rotation shaft of the electric motor. Therefore, for example, it is possible to freely control presence/absence of shaft center cooling of the electric motor (presence/absence of supply of cooling oil to the shaft center of the rotation shaft of the electric motor) during traveling of the vehicle (traveling in an electric mode) by the power of the electric motor. Further, when the vehicle is traveling only by the power of the engine without using the electric motor, e.g., during high-speed cruising of the vehicle, it is possible to stop the supply of cooling oil to the shaft center of the rotation shaft of the electric motor to prevent shaft center cooling. As a result, since the operating resistance of the vehicle driving device and the power transmission device resulting from the oil flowing through the hydraulic circuit and the cooling oil passage can be effectively reduced, it is possible to improve the fuel efficiency of the vehicle.

Further, in the above hydraulic circuit according to an embodiment of the disclosure, the oil pump (OP2) may be one oil pump (second oil pump OP2 in the embodiment to be described later) driven with rotation of wheels (20) of the vehicle, the hydraulic circuit may further include another oil pump (first oil pump OP1 in the embodiment to be described later) driven by an engine (10), which is the power source of the vehicle, or the electric motor (11), and the cooling oil passage shift valve (84) may be configured to be switched by a hydraulic pressure of oil supplied from the one oil pump (OP2).

According to this configuration, since the cooling oil passage shift valve is configured to be switched by a hydraulic pressure of oil supplied from the one oil pump driven with rotation of the wheels of the vehicle, a hydraulic pressure linked with the vehicle speed can be supplied to the cooling oil passage shift valve. Accordingly, for example, even during high-speed traveling in which the load of the electric motor is relatively low, it is assumed that the iron loss of the electric motor increases due to the increase in the rotational speed of the electric motor, and the rotor and the rotation shaft need to be cooled; in such a case, cooling of the electric motor can be appropriately performed. Therefore, with a simple configuration which keeps the number of parts small without adding new components to the vehicle, it is possible to perform shaft center cooling of the electric motor when traveling at a vehicle speed for which a necessary situation is assumed.

Further, the above hydraulic circuit according to an embodiment of the disclosure may include a water-cooled type oil cooler (44) which cools oil flowing through the cooling oil passage (L1) by cooling water of the vehicle; a first temperature sensor (95) which detects a temperature of oil flowing through the cooling oil passage (L1); and a switching valve (46) which switches presence/absence of supply of the cooling water to the oil cooler (44) according to the detected temperature of the first temperature sensor (95).

In the case where the water-cooled type oil cooler which cools oil flowing through the cooling oil passage by the cooling water of the vehicle is provided, if oil is constantly cooled by the cooling water, since the temperature of the oil in the hydraulic circuit will not rise easily, the operating resistance (friction) of the vehicle driving device and the power transmission device resulting from the oil flowing through the hydraulic circuit and the cooling oil passage continues to be high, and there is a concern that it will hinder the improvement of fuel efficiency of the vehicle. In contrast, in the above configuration of the disclosure, by providing the switching valve for switching presence/absence of supply of the cooling water to the oil cooler according to the detected temperature of the first temperature sensor, cooling of oil by the oil cooler may be performed only when necessary. Therefore, the operating resistance (friction) of the vehicle driving device and the power transmission device can be suppressed to a low level, and the fuel efficiency of the vehicle can be improved.

Further, the above hydraulic circuit according to an embodiment of the disclosure may include a second temperature sensor (96) which detects a temperature of oil stored in an oil reservoir (51) of the vehicle, and a controller for detecting a failure of the switching valve (46). The controller may detect a failure of the switching valve (46) based on the detected temperatures of the first temperature sensor (95) and the second temperature sensor (96).

According to this configuration, with a failure of the switching valve being detected based on the detected temperatures of the first temperature sensor and the second temperature sensor, even if the switching valve fails, the failure can be appropriately detected.

Further, in the above hydraulic circuit according to an embodiment of the disclosure, the first temperature sensor (95) may be provided on a downstream side of the oil cooler (44) in the cooling oil passage (L1).

Conventionally, the temperature of the oil supplied to the electric motor is predicted to determine whether protection control by cooling the electric motor is required. In contrast, according to the above configuration of the disclosure, by providing the first temperature sensor which detects the temperature of the oil after passing through the oil cooler in the cooling oil passage, it is possible to determine whether protection control by cooling the electric motor is required based on the detected temperature of the first temperature sensor. Therefore, it is possible to improve the accuracy of determining whether protection control by cooling the electric motor is required (the accuracy of estimating the magnet temperature of the electric motor). Accordingly, the size of the cooling device and the like can be reduced and the configuration can be simplified, and the frequency of performing protection control of the electric motor can be reduced.

Further, according to an embodiment of the disclosure, in this case, the first temperature sensor (95) may be provided on the downstream side of the oil cooler (44) in the cooling oil passage (L1) and on a downstream side of the cooling oil passage shift valve (84).

According to this configuration, by providing the first temperature sensor on the downstream side of the cooling oil passage shift valve in the cooling oil passage, it is possible to detect both a failure of the switching valve and a failure of the cooling oil passage shift valve. Therefore, since more reliable failure detection can be performed with a simple configuration in which the number of parts is reduced, the reliability of the hydraulic circuit and the vehicle driving device can be further improved.

The reference signs in the parentheses above serve as reference to the drawing reference signs of the corresponding components in the embodiments to be described later.

According to the hydraulic circuit for a vehicle driving device according to the disclosure, while having a simple structure with a small number of parts, it is possible to effectively reduce the operating resistance of the vehicle driving device and the power transmission device resulting from oil flowing through the hydraulic circuit and the cooling oil passage, and it is possible to improve fuel efficiency of the vehicle.

DESCRIPTION OF THE EMBODIMENTS

Embodiments of the disclosure provide a hydraulic circuit for a vehicle driving device capable of effectively reducing an operating resistance of a vehicle driving device and a power transmission device resulting from oil flowing through the hydraulic circuit and a cooling oil passage with a simple configuration, and capable of improving fuel efficiency of a vehicle.

Figure 1:
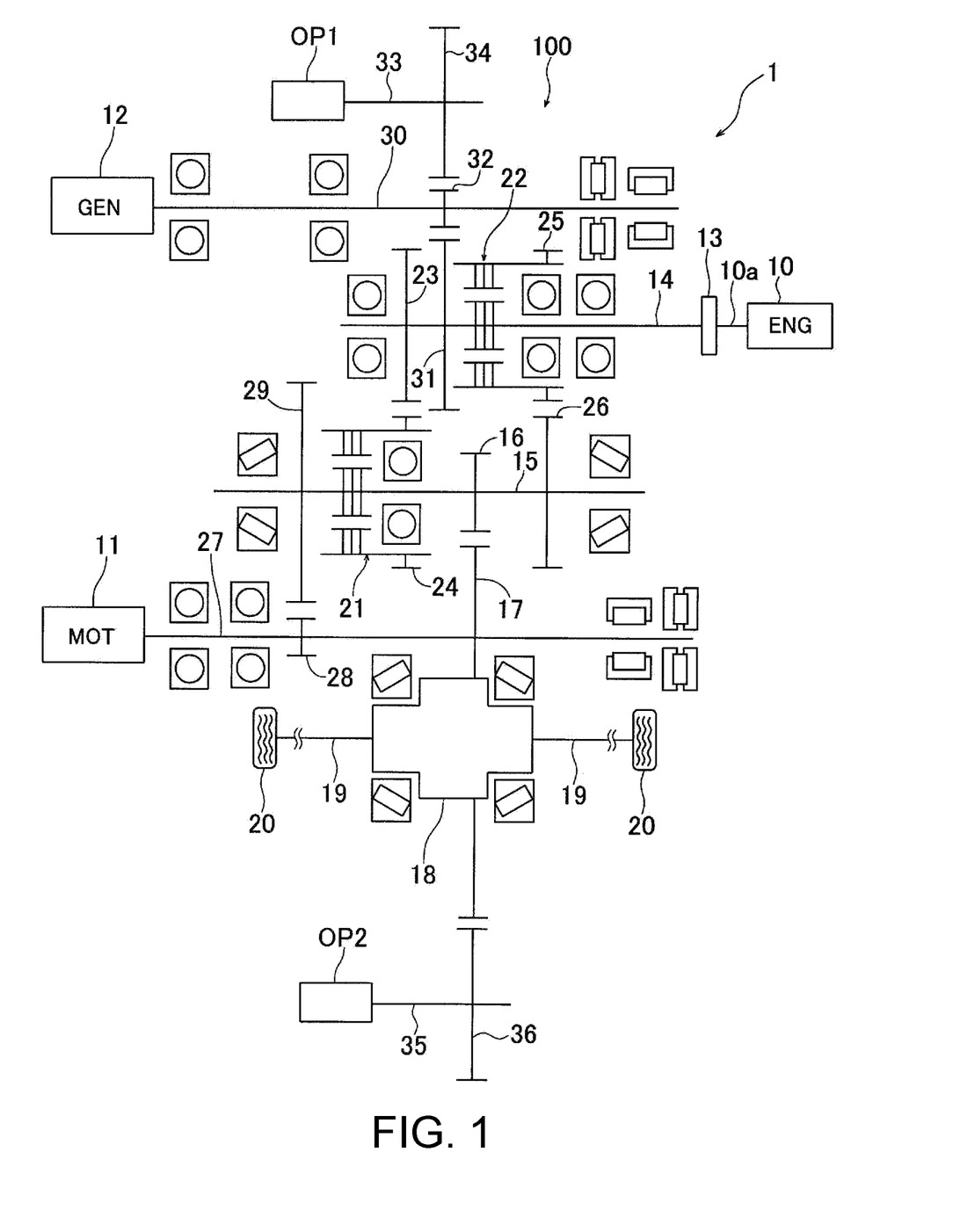
FIG. 1 is a skeleton diagram showing an overall configuration of a vehicle including a driving device according to an embodiment of the disclosure.

Hereinafter, embodiments of the disclosure will be described with reference to the accompanying drawings. FIG. 1 is a skeleton diagram showing an overall configuration of a vehicle including a driving device according to an embodiment of the disclosure. First, the structure of the driving device will be described with reference to FIG. 1. As shown in FIG. 1, a driving device 100 mounted on a vehicle 1 includes an engine (internal combustion engine; ENG) 10, a first electric motor (traction motor; MOT) 11, and a second electric motor (generator; GEN) 12.

The first electric motor 11 may be driven by receiving electric power from a battery (not shown) to apply a driving force to the vehicle 1. Further, during deceleration traveling, the first electric motor 11 may generate electricity by rotational driving from the wheel (driving wheel) 20 and 20 side to charge the battery (energy regeneration). Further, the second electric motor 12 may generate electricity mainly by rotational driving of the engine 10 to charge the battery. In this manner, the vehicle 1 mounted with the driving device 100 is a hybrid vehicle in which the engine 10 and the first electric motor 11 are taken as driving sources and electricity may be generated by the first electric motor 11 and the second electric motor 12.

The driving device 100 includes an input shaft 14 connected to an output shaft (crankshaft) 10a of the engine 10 via a flywheel 13, and an output shaft 15, a motor shaft 27, and a generator shaft 30 arranged parallel to the input shaft 14. The output shaft 15 is connected to the left and right wheels (driving wheels) 20 and 20 via a final driving gear 16, a final driven gear 17, a differential gear 18, and left and right driving shafts 19 and 19.

The output shaft 15 supports a first driven gear 24 via a high clutch (first clutch) 21, and the first driven gear 24 meshes with a first driving gear 23 fixed to the input shaft 14. Further, the input shaft 14 supports a second driving gear 25 via a low clutch (second clutch) 22, and the second driving gear 25 meshes with a second driven gear 26 fixed to the output shaft 15.

Further, a third driving gear 28 fixed to the motor shaft 27 and a third driven gear 29 fixed to the output shaft 15 mesh with each other, and a fourth driving gear 31 fixed to the input shaft 14 and a fourth driven gear 32 fixed to the generator shaft 30 mesh with each other.

According to the driving device 100 configured in this manner, when the first electric motor 11 is driven, the driving force of the first electric motor 11 is transmitted to the left and right wheels (driving wheels) 20 and 20 sequentially via the motor shaft 27, the third driving gear 28, the third driven gear 29, the output shaft 15, the final driving gear 16, the final driven gear 17, the differential gear 18, and the driving shafts 19 and 19.

Since the first electric motor 11 may rotate in both forward and reverse directions, the vehicle 1 can be driven forward and backward according to the rotation direction of the first electric motor 11. Further, during deceleration of the vehicle 1, if the first electric motor 11 is driven by the driving force transmitted from the wheels 20 and 20 to function as a generator, the kinetic energy of the vehicle 1 can be recovered as electric energy.

On the other hand, if the engine 10 is driven with the high clutch 21 being engaged and the low clutch 22 being released, the driving force of the engine 10 is transmitted to the left and right wheels 20 and 20 sequentially via the input shaft 14, the first driving gear 23, the first driven gear 24, the high clutch 21, the output shaft 15, the final driving gear 16, the final driven gear 17, the differential gear 18, and the driving shafts 19 and 19 (engine traveling high mode). Further, if the engine 10 is driven with the low clutch 22 being engaged and the high clutch 21 being released, the driving force of the engine 10 is transmitted to the left and right wheels 20 and 20 sequentially via the input shaft 14, the low clutch 22, the second driving gear 25, the second driven gear 26, the output shaft 15, the final driving gear 16, the final driven gear 17, the differential gear 18, and the driving shafts 19 and 19 (engine traveling low mode).

At this time, by idling the first electric motor 11, the vehicle 1 can be driven forward only by the driving force of the engine 10. Further, the driving force of the first electric motor 11 can be assisted by the driving force of the engine 10 during forward traveling of the vehicle 1.

Further, when the engine 10 is driving, the driving force of the engine 10 is transmitted to the second electric motor 12 sequentially via the input shaft 14, the fourth driving gear 31, the fourth driven gear 32, and the generator shaft 30. Accordingly, the second electric motor 12 can generate electricity. Conversely, if the second electric motor 12 is driven as a motor while the engine 10 is stopped, the engine 10 can be started by the driving force of the second electric motor 12.

Figure 2:
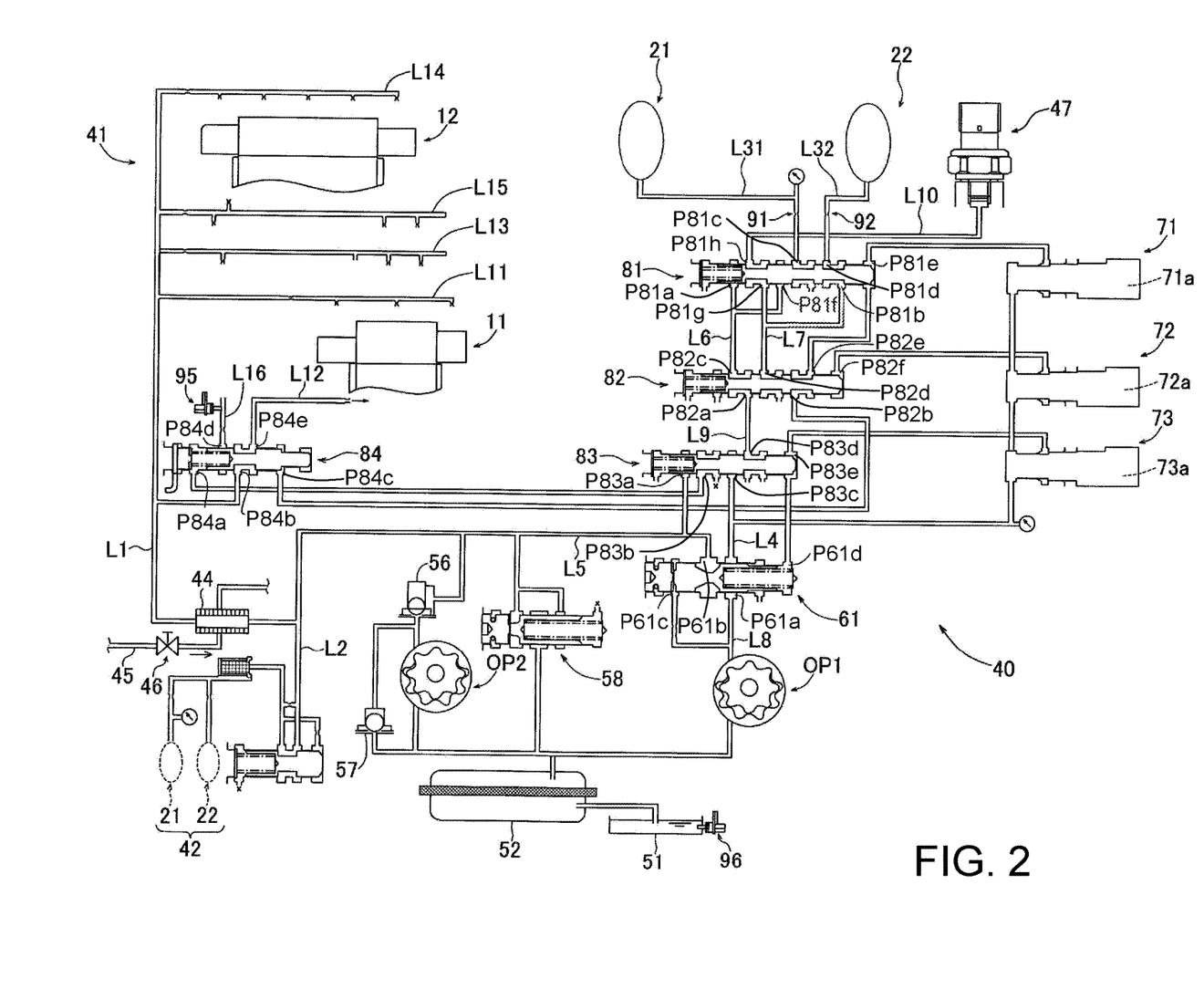
FIG. 2 is a view showing a hydraulic circuit according to an embodiment of the disclosure.

Next, a hydraulic circuit according to an embodiment of the disclosure will be described. FIG. 2 is a view showing a hydraulic circuit for a vehicle driving device. A hydraulic circuit 40 shown in the figure supplies an appropriate hydraulic pressure to each of a cooling oil passage L1, a lubricating oil passage L2, a high clutch oil passage (first clutch oil passage) L31, and a low clutch oil passage (second clutch oil passage) L32.

Further, the hydraulic circuit 40 includes a first oil pump ("another oil pump" of the disclosure) OP1 and a second oil pump ("one oil pump" of the disclosure) OP2. As shown in FIG. 1, the first oil pump OP1 is a mechanical oil pump driven with the driving of the engine 10. Herein, a first oil pump gear 34 fixed to a pump shaft (first oil pump driving shaft) 33 of the first oil pump OP1 meshes with the fourth driven gear 32. Accordingly, the first oil pump OP1 is constantly driven during driving of the engine 10. On the other hand, the second oil pump OP2 is a mechanical oil pump driven with the rotation of the driving shaft 19. Herein, a second oil pump gear 36 fixed to a pump shaft (second oil pump driving shaft) 35 of the second oil pump OP2 meshes with the final driven gear 17. Accordingly, the second oil pump OP2 is constantly driven during forward traveling of the vehicle.

The characteristics of the first oil pump OP1 mainly used for gear shifting are set such that the discharge pressure is relatively high and the discharge flow rate is relatively small. The characteristics of the second oil pump OP2 mainly used for lubrication and cooling are set such that the discharge pressure is relatively low and the discharge flow rate is relatively large. Accordingly, the total driving load of the hydraulic source of the driving device 100 can be reduced.

The cooling oil passage L1 is an oil passage for cooling a cooled portion 41 with oil. Herein, the cooled portion 41 is the first electric motor 11 and the second electric motor 12. Further, an oil cooler 44 is provided in the cooling oil passage L1. On the downstream side of the cooling oil passage L1, the oil passage branches into a first dropping cooling oil passage L11 for dropping and supplying cooling oil to each part of the first electric motor 11, a first shaft center cooling oil passage L12 for supplying cooling oil to a shaft center of a rotation shaft of the first electric motor 11, a rotation shaft cooling oil passage L13 for supplying cooling oil to the rotation shaft (the portion other than the shaft center) of the first electric motor 11, a second dripping cooling oil passage L14 for dripping and supplying cooling oil to each part of the second electric motor 12, and a second shaft center cooling oil passage L15 for supplying cooling oil to a shaft center of a rotation shaft of the second electric motor 12.

As described above, in the hydraulic circuit of this embodiment, as the cooling oil passage for cooling the rotation shaft of the first electric motor 11, two systems of cooling oil passages are provided, i.e., the first shaft center cooling oil passage L12 which is a cooling oil passage dedicated to the shaft center and supplies cooling oil to the shaft center of the rotation shaft, and the rotation shaft cooling oil passage L13 which supplies cooling oil to the portion of the rotation shaft other than the shaft center. The first shaft center cooling oil passage L12 is configured so that, by switching a cooling oil passage shift valve (fourth shift valve) 84 (to be described later), it is possible to switch presence/absence of supply of cooling oil to the first shaft center cooling oil passage L12.

The lubricating oil passage L2 is an oil passage for lubricating a lubricated portion 42 with oil. Herein, the lubricated portion 42 is friction materials of the high clutch 21 and the low clutch 22. The high clutch oil passage L31 and the low clutch oil passage L32 are oil passages for supplying oil respectively to the high clutch 21 and the low clutch 22, and are connected to oil chambers, specifically, back pressure chambers, of the high clutch 21 and the low clutch 22.

Further, an electronic control unit (ECU; not shown) is mounted on the vehicle to perform power supply control, energy regeneration control (charge control), and control of the driving device 100. The ECU controls the first electric motor 11, the second electric motor 12, and the hydraulic circuit 40 (e.g., a first solenoid valve 71, a second solenoid valve 72, a third solenoid valve 73, and a switching valve 46 to be described later).

The ECU includes a CPU executing various arithmetic processes and a storage device (memory) composed of a ROM and a RAM storing various arithmetic programs executed by the CPU, various tables, arithmetic results, etc. The ECU is inputted with various electrical signals and outputs driving signals to the outside based on the arithmetic results.

The hydraulic circuit 40 includes a regulator valve (pressure regulating valve) 61, a first solenoid valve 71, a second solenoid valve 72, a third solenoid valve 73, a first shift valve 81, a second shift valve 82, a third shift valve 83, and a cooling oil passage shift valve (fourth shift valve) 84.

The regulator valve 61 includes a spool urged to the left side by a spring. The spool is formed with grooves, and a first port P61a, a second port P61b, a feedback port P61c, and a fourth port P61d are formed to face the outer peripheral surface of the spool. The first port P61a is connected to a source oil passage L8 and a clutch source oil passage L4. The second port P61b is connected to the cooling oil passage L1 and the lubricating oil passage L2 via a cooling and lubricating source oil passage L5. The feedback port P61c is connected to the source oil passage L8. The fourth port P61d is connected to the third solenoid valve 73 via the third shift valve 83.

The first shift valve 81 includes a spool urged to the right side by a spring. The spool is formed with grooves, and a first port P81a, a second port P81b, a third port P81c, a fourth port P81d, a fifth port P81e, a sixth port P81f, a seventh port P81g, and an eighth port P81h are formed to face the outer peripheral surface of the spool. The first port P81a is connected to a third port P82c of the second shift valve 82 via a high-pressure side communication oil passage L6. A branch oil passage branched from a low-pressure side communication oil passage L7 is connected to the second port P81b. The third port P81c is connected to the high clutch oil passage L31. The fourth port P81d is connected to the low clutch oil passage L32. The fifth port P81e is connected to the first solenoid valve 71. Further, a branch oil passage branched from the high-pressure side communication oil passage L6 is connected to the sixth port P81f. Further, the seventh port P81g is connected to a fourth port P82d of the second shift valve 82 via the low-pressure side communication oil passage L7. A sensor oil passage (third communication oil passage) L10 communicating with a hydraulic sensor 47 is connected to the eighth port P81h.

The second shift valve 82 includes a spool urged to the right side by a spring. The spool is formed with grooves, and a first port P82a, a second port P82b, a third port P82c, a fourth port P82d, a fifth port P82e, and a sixth port P82f are formed to face the outer peripheral surface of the spool. The first port P82a is connected to a fourth port P83d of the third shift valve 83 via an oil passage L9. The second port P82b is connected to a third port P84c of the cooling oil passage shift valve 84. The third port P82c is connected to the first port P81a of the first shift valve 81 via the high-pressure side communication oil passage L6. The fourth port P82d is connected to the second port P81b and the seventh port P81g of the first shift valve 81 via the low-pressure side communication oil passage L7. The fifth port P82e is connected to the first solenoid valve 71 via the fifth port P81e of the first shift valve 81. The sixth port P82f is connected to the second solenoid valve 72.

The third shift valve 83 is provided in the clutch source oil passage L4 between the regulator valve 61 and the second shift valve 82. The third shift valve 83 includes a spool urged to the right side by a spring. The spool is formed with grooves, and a first port P83a, a second port P83b, a third port P83c, a fourth port P83d, and a fifth port P83e are formed to face the outer peripheral surface of the spool. The first port P83a is connected to the cooling and lubricating source oil passage L5. The second port P83b is connected to a first port P84a of the cooling oil passage shift valve 84. The third port P83c is connected to the regulator valve 61 via the clutch source oil passage L4. The fourth port P83d is connected to the first port P82a of the second shift valve 82 via the oil passage L9. The fifth port P83e is connected to the third solenoid valve 73. Therefore, the control pressure outputted from the third solenoid valve 73 is inputted to the fifth port P83e of the third shift valve 83 as a back pressure which presses it toward the opening side on the left side of the drawing.

The cooling oil passage shift valve (fourth shift valve) 84 is provided on the front side (upstream side) of the first shaft center cooling oil passage L12 in the cooling oil passage L1. The cooling oil passage shift valve 84 includes a spool urged to the right side by a spring. The spool is formed with grooves, and a first port P84a, a second port P84b, a third port P84c, a fourth port P84d, and a fifth port P84e are formed to face the outer peripheral surface of the spool. The first port P84a is connected to the second port P83b of the third shift valve 83. The second port P84b is connected to the cooling oil passage L1. The fourth port P84d is connected to an oil passage L16 provided with a first temperature sensor 95 to be described later. The fifth port P84e is connected to the first shaft center cooling oil passage L12. Further, the third port P84c is connected to the first solenoid valve 71 via the second port P82b of the second shift valve 82 and the fifth port P81e of the first shift valve 81. Therefore, the control pressure outputted from the first solenoid valve 71 is inputted to the third port P84c of the cooling oil passage shift valve 84 as a back pressure which presses it toward the opening side on the left side of the drawing.

Further, a hydraulic sensor 47 is provided to detect a hydraulic pressure of the oil passage L10 connected to the first shift valve 81. Further, a relief valve 58 is connected to the cooling and lubricating source oil passage L5. Further, a first temperature sensor 95 is provided on the downstream side of the cooling oil passage shift valve 84 to detect a temperature of the oil leaving the oil cooler 44, and a second temperature sensor 96 is provided at an oil pan (oil reservoir) 51 to detect an oil temperature of the oil in the oil pan 51.

The discharge port of the first oil pump OP1 is connected to the first port P61a of the regulator valve 61 via the source oil passage L8. When the first oil pump OP1 is driven, oil is pumped from the oil pan 51, and the oil is supplied to the regulator valve 61 via a strainer 52.

On the other hand, when the second oil pump OP2 is driven, the oil pumped from the oil pan 51 is supplied to the cooling and lubricating source oil passage L5. Two check valves (one-way valves) 56 and 57 are provided between the second oil pump OP2 and the lubricating oil passage L2 to prevent occurrence of aeration in the second oil pump OP2 during backward traveling of the vehicle 1.

The regulator valve 61 regulates the hydraulic pressure discharged from the first oil pump OP1 and is configured to be able to selectively set an operating state in which a high line pressure (a hydraulic pressure high enough to operate the high clutch 21 and the low clutch 22) is supplied to the clutch source oil passage L4 connected to the third shift valve 83, and a set state in which a low line pressure (a hydraulic pressure too low for the high clutch 21 and the low clutch 22 to operate) is supplied to the clutch source oil passage L4. The regulator valve 61 supplies a hydraulic pressure to the cooling and lubricating source oil passage L5 communicating with the cooling oil passage L1 and the lubricating oil passage L2 in both the operating state and the set state.

The first shift valve 81 is configured to be able to selectively set a set state in which the high-pressure side communication oil passage L6 and the high clutch oil passage L31 are not communicated (blocked) and the low-pressure side communication oil passage L7 and the low clutch oil passage L32 are communicated, and an operating state in which the high-pressure side communication oil passage L6 and the high clutch oil passage L31 are communicated and the low-pressure side communication oil passage L7 and the low clutch oil passage L32 are not communicated (blocked). Further, the first shift valve 81 communicates the high-pressure side communication oil passage L6 and the sensor oil passage L10 in the above operating state, and communicates the low-pressure side communication oil passage L7 and the sensor oil passage L10 in the above set state.

Further, the high clutch oil passage L31 is provided with a first orifice 91, and the low clutch oil passage L32 is provided with a second orifice 92. The first orifice 91 limits the flow rate of oil supplied to the high clutch 21 in the high clutch oil passage L31, and the second orifice 92 limits the flow rate of oil supplied to the low clutch 22 in the low clutch oil passage L32.

The second shift valve 82 is configured to be able to selectively set a set state in which the oil passage L9 and the high-pressure side communication oil passage L6 are communicated and the oil passage L9 and the low-pressure side communication oil passage L7 are not communicated (blocked), and an operating state in which the oil passage L9 and the low-pressure side communication oil passage L7 are communicated and the oil passage L9 and the high-pressure side communication oil passage L6 are not communicated (blocked).

The third shift valve 83 is configured to be able to selectively set an operating state in which the clutch source oil passage L4 and the oil passage L9 (second shift valve 82) are communicated, and a set state in which the clutch source oil passage L4 and the oil passage L9 (second shift valve 82) are not communicated (blocked).

The cooling oil passage shift valve 84 is configured to be able to selectively set an operating state in which the cooling oil passage L1 and the first shaft center cooling oil passage L12 are communicated, and a set state in which the cooling oil passage L1 and the first shaft center cooling oil passage L12 are not communicated (blocked).

The first solenoid valve 71, the second solenoid valve 72, and the third solenoid valve 73 are normally closed type linear solenoid valves in which the valve opens according to a current value energized to a first solenoid 71a, a second solenoid 72a, and a third solenoid 73a, a control pressure is outputted according to the energization current value, and the valve is closed and the output of the control pressure is stopped when the energization is cut off.

The control pressure outputted from the first solenoid valve 71 is inputted to the fifth port P81e of the first shift valve 81 as a back pressure which presses it toward the opening side on the left side of the drawing. Accordingly, a hydraulic pressure corresponding to the control pressure is supplied from the first solenoid valve 71 to the first shift valve 81 to switch between the operating state and the set state of the first shift valve 81.

Further, the control pressure outputted from the first solenoid valve 71 is inputted to the third port P84c of the cooling oil passage shift valve 84 as a back pressure which presses it toward the opening side on the left side of the drawing. Accordingly, a hydraulic pressure corresponding to the control pressure is supplied from the first solenoid valve 71 to the cooling oil passage shift valve 84 to switch between the operating state and the set state of the cooling oil passage shift valve 84.

The control pressure outputted from the second solenoid valve 72 is inputted to the sixth port P82f of the second shift valve 82 as a back pressure which presses it toward the opening side on the left side of the drawing. Accordingly, a hydraulic pressure corresponding to the control pressure is supplied from the second solenoid valve 72 to the second shift valve 82 to switch between the operating state and the set state of the second shift valve 82.

The control pressure outputted from the third solenoid valve 73 is inputted to the fifth port P83e of the third shift valve 83 as a back pressure which presses it toward the opening side on the left side of the drawing. Accordingly, the switching between the operating state and the set state of the third shift valve 83 is performed. Further, the control pressure outputted from the third solenoid valve 73 is inputted to the fourth port P61d of the regulator valve 61 as a back pressure which presses it toward the opening side on the left side of the drawing. Accordingly, the switching between the operating state and the set state of the regulator valve 61 is performed.

Figure 3:
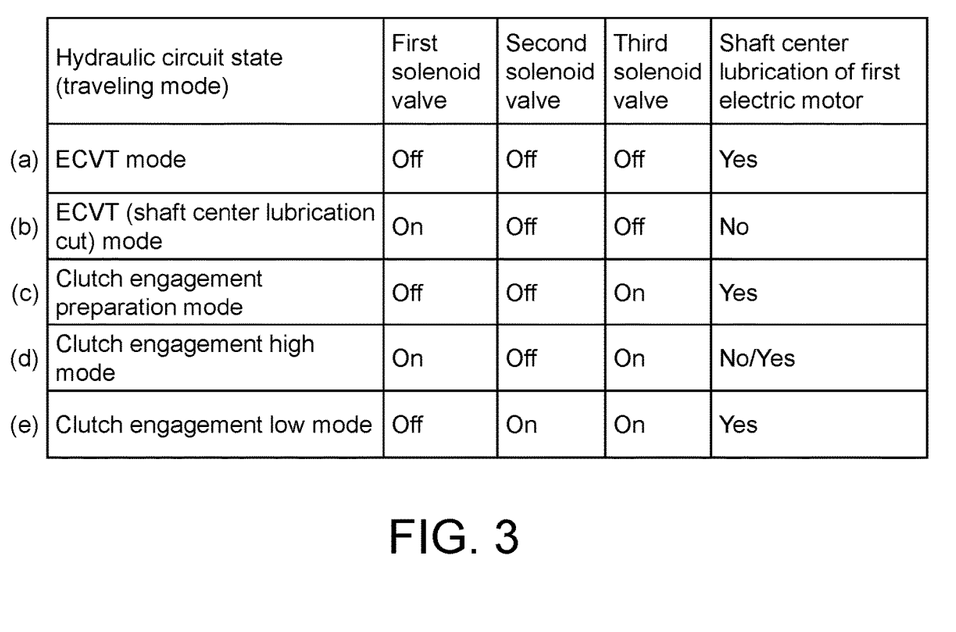
FIG. 3 is a table showing the relationship between the state of the hydraulic circuit in each operation mode of the hydraulic circuit and turn-on/turn-off of a first solenoid valve, a second solenoid valve, and a third solenoid valve, and presence/absence of shaft center lubrication of a first electric motor.

Next, the operation modes in the hydraulic circuit 40 having the above configuration will be described. FIG. 3 is a table showing the relationship between the state of the hydraulic circuit (traveling state of the vehicle) in each operation mode of the hydraulic circuit and turn-on/turn-off of the first solenoid valve 71, the second solenoid valve 72, and the third solenoid valve 73, and presence/absence of shaft center lubrication of the first electric motor 11.

As shown in FIG. 3, the hydraulic circuit 40 may include the following modes: (a) electric traveling mode (hereinafter referred to as an "ECVT mode"), (b) electric traveling (shaft center lubrication cut) mode (hereinafter referred to as an "ECVT (shaft center lubrication cut) mode"), (c) clutch engagement preparation mode, (d) clutch engagement high mode, and (e) clutch engagement low mode.

In the ECVT mode of (a) of FIG. 3, the first solenoid valve 71, the second solenoid valve 72, and the third solenoid valve 73 are all turned off. Accordingly, the first shift valve 81, the second shift valve 82, and the third shift valve 83 are all in the set state, and no oil is supplied to either the high clutch oil passage L31 or the low clutch oil passage L32. As a result, both the high clutch 21 and the low clutch 22 are in the released state (Lo release, Hi release). Further, with the regulator valve 61 turning into the operating state and the low line pressure being set, the vehicle 1 turns into an EV traveling state in which the vehicle 1 is driven by the driving force of the first electric motor 11. In this ECVT mode, with the first solenoid valve 71, the second solenoid valve 72, and the third solenoid valve 73 all turned off, power consumption can be reduced. Then, with the cooling oil passage shift valve 84 turning into the operating state, cooling oil is supplied to the first shaft center cooling oil passage L12. Accordingly, shaft center cooling of the first electric motor 11 is performed.

In the ECVT (shaft center lubrication cut) mode of (b) of FIG. 3, the first solenoid valve 71 is switched from off to on in the ECVT mode of (a) of FIG. 3. Both the second solenoid valve 72 and the third solenoid valve 73 remain off. Accordingly, the first shift valve 81 turns into the operating state. Also in this state, since oil is not supplied to either the high clutch oil passage L31 or the low clutch oil passage L32, both the high clutch 21 and the low clutch 22 turn into the released state (Lo release, Hi release). Further, with the regulator valve 61 turning into the operating state and the low line pressure being set, in this case, the vehicle 1 also turns into the EV traveling state in which the vehicle 1 is driven by the driving force of the first electric motor 11. Then, with the cooling oil passage shift valve 84 turning into the set state, the cooling oil is not supplied to the first shaft center cooling oil passage L12. Therefore, shaft center cooling of the first electric motor 11 is not performed.

Figure 4:
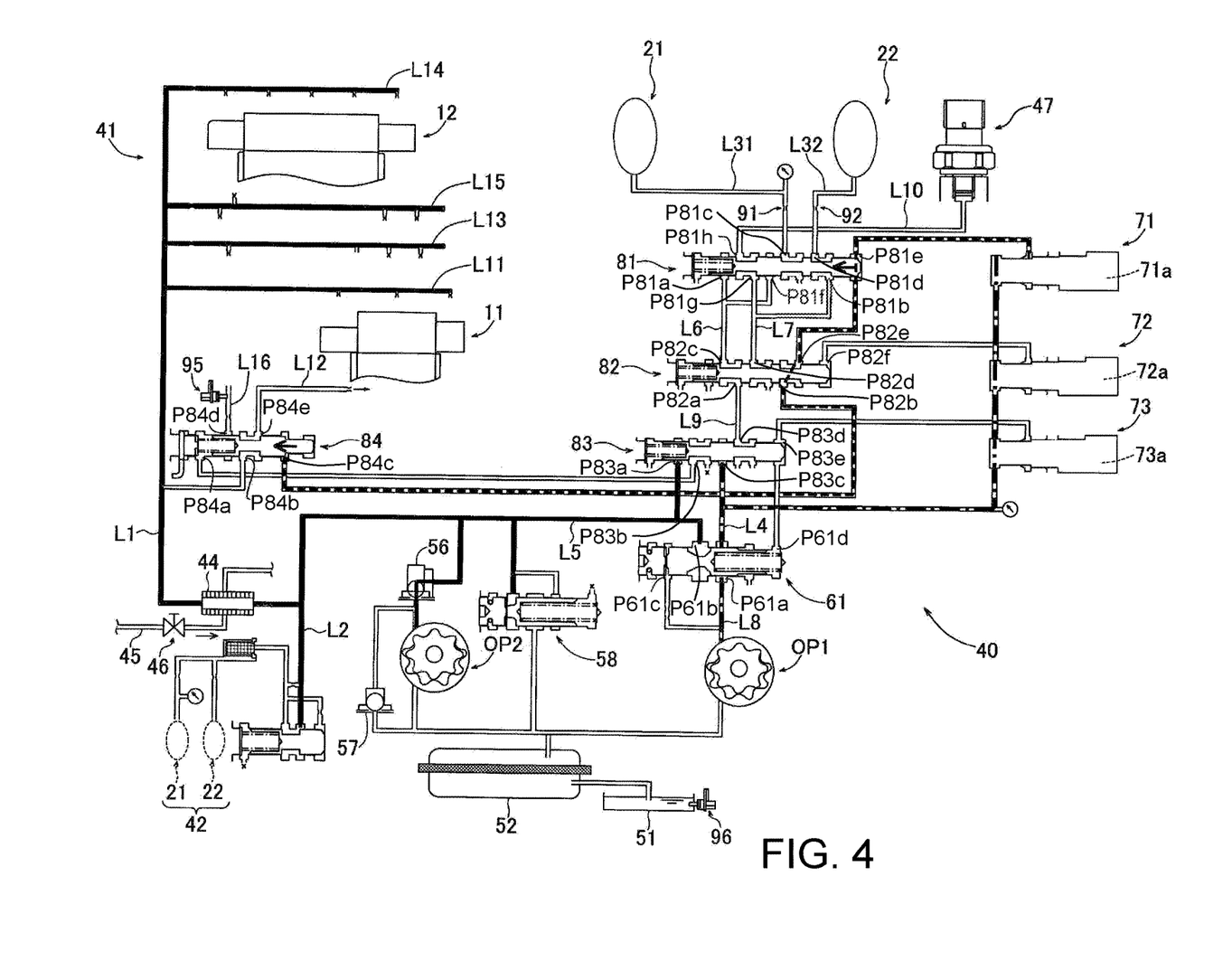
FIG. 4 is a hydraulic circuit diagram showing the flow of oil in an ECVT (shaft center lubrication cut) mode.

FIG. 4 is a hydraulic circuit diagram showing the flow of oil in the ECVT (shaft center lubrication cut) mode. In the figure, the flow of oil from the first oil pump OP1 is shown by a thick dot-dash line, the flow of oil from the second oil pump OP2 is shown by a thick solid line, and the flow of a signal pressure from the first solenoid valve 71 is shown by a thick dot line. As shown in the figure, in the ECVT (shaft center lubrication cut) mode, the line pressure is low, and also in this state, with the signal pressure of the first solenoid valve 71 being introduced into the cooling oil passage shift valve 84, oil (hydraulic pressure) from the second port P83b of the third shift valve 83 cannot enter the first port P84a (spring chamber) of the cooling oil passage shift valve 84. Accordingly, the cooling oil passage shift valve 84 can be brought into a state (set state) in which the supply of oil to the first shaft center cooling oil passage L12 is cut. Therefore, the supply of cooling oil to the first shaft center cooling oil passage L12 is cut (stopped), and shaft center cooling of the first electric motor 11 can be prevented.

In the clutch engagement preparation mode of (c) of FIG. 3, both the first solenoid valve 71 and the second solenoid valve 72 are turned off, and the third solenoid valve 73 is turned on. Accordingly, the first shift valve 81, the second shift valve 82, and the third shift valve 83 all turn into the set state, and no oil is supplied to either the high clutch oil passage L31 or the low clutch oil passage L32. As a result, both the high clutch 21 and the low clutch 22 turn into the released state (Lo release, Hi release). Further, with the regulator valve 61 turning into the set state and the high line pressure being set, the vehicle 1 turns into an engine traveling preparation state (high clutch preparation state or low clutch preparation state) for engaging the high clutch 21 or the low clutch 22 and preparing for engine traveling which drives the vehicle 1 by the driving force of the engine 10.

In the clutch engagement high mode of (d) of FIG. 3, both the first solenoid valve 71 and the third solenoid valve 73 are turned on, and the second solenoid valve 72 is turned off. Accordingly, with the first shift valve 81 being bought into the operating state, the second shift valve 82 being brought into the set state, and the third shift valve 83 being brought into the operating state, oil is not supplied to the low clutch oil passage L32, and oil is supplied only to the high clutch oil passage L31. As a result, the low clutch 22 turns into the released state, and the high clutch 21 turns into the engaged state (Lo release, Hi engage). Therefore, the vehicle 1 turns into an engine traveling mode in which the high clutch 21 is engaged and the vehicle 1 is driven by the driving force of the engine 10.

Figure 5:
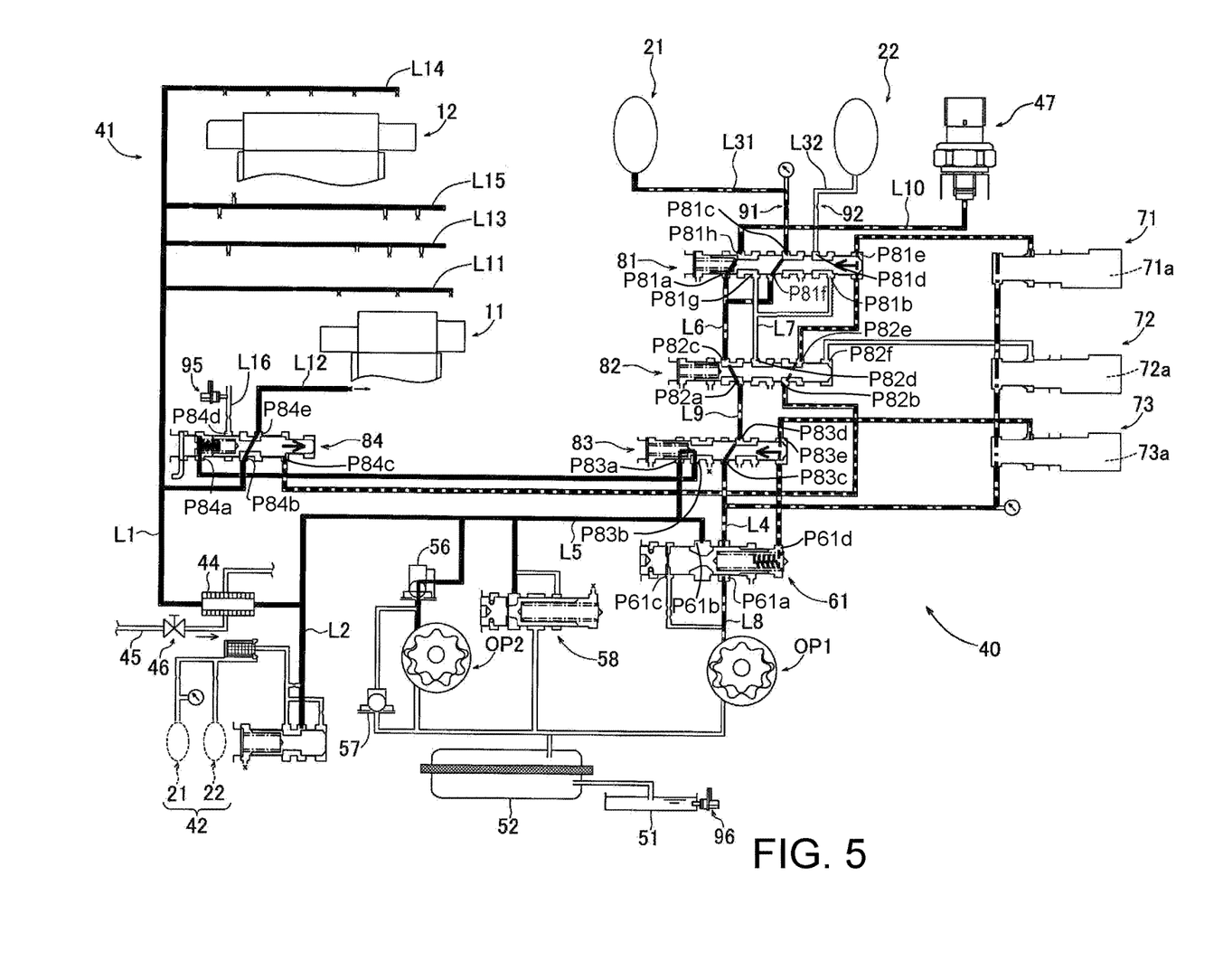
FIG. 5 is a hydraulic circuit diagram showing the flow of oil in a clutch engagement high mode.

FIG. 5 is a hydraulic circuit diagram showing the flow of oil in the clutch engagement high mode. As shown in the figure, in the clutch engagement high mode, with the hydraulic pressure of the oil introduced from the second port P83b of the third shift valve 83 into the first port P84a (spring chamber) of the cooling oil passage shift valve 84, the spool of the cooling oil passage shift valve 84 moves to the right side. Accordingly, the cooling oil passage shift valve 84 can be operated toward a side (operating state) on which oil is supplied to the first shaft center cooling oil passage L12. As a result, cooling oil is supplied to the first shaft center cooling oil passage L12, and shaft center cooling of the first electric motor 11 is performed.

In the clutch engagement low mode of (e) of FIG. 3, the first solenoid valve 71 is turned off, and both the second solenoid valve 72 and the third solenoid valve 73 are turned on. Accordingly, with the first shift valve 81 being brought into the set state, the second shift valve 82 being brought into the operating state, and the third shift valve 83 being brought into the operating state, oil is not supplied to the high clutch oil passage L31, and oil is supplied only to the low clutch oil passage L32. As a result, the high clutch 21 turns into the released state, and the low clutch 22 turns into the engaged state (Lo engage, Hi release). Therefore, the vehicle 1 turns into the engine traveling mode in which the low clutch 22 is engaged and the vehicle 1 is driven by the driving force of the engine 10.

As described above, a hydraulic circuit for a vehicle driving device of this embodiment includes: a first oil pump OP1 driven with driving of an engine 10 which is a power source of a vehicle 1; a second oil pump OP2 driven with rotation of wheels (driving wheels) 20 of the vehicle 1; a high clutch oil passage L31 and a low clutch oil passage L32 connected to oil chambers of a high clutch 21 and a low clutch 22; a cooling oil passage L1 for guiding oil to a first electric motor 11 and a second electric motor 12 which are a cooled portion of the vehicle 1; a regulator valve (pressure regulating valve) 61 which regulates a pressure of oil discharged from the first oil pump OP1 and the second oil pump OP2; and a first shift valve 81, a second shift valve 82, and a third shift valve 83 which switch a path of the oil regulated by the regulator valve 61. Supply of oil to the high clutch oil passage L31, the low clutch oil passage L32, and the cooling oil passage L1 is switched by switching of the regulator valve 61 and the first shift valve 81, the second shift valve 82, and the third shift valve 83. The cooling oil passage L1 of this hydraulic circuit includes: a first shaft center cooling oil passage L12 which supplies cooling oil to a shaft center of a rotation shaft of the first electric motor 11; and a cooling oil passage shift valve 84 which switches presence/absence of supply of oil to the first shaft center cooling oil passage L12.

According to the hydraulic circuit for a vehicle driving device of this embodiment, since oil is selectively supplied to the first shaft center cooling oil passage L12 which supplies cooling oil to the shaft center of the rotation shaft of the first electric motor 11 by switching of the cooling oil passage shift valve 84, compared to the hydraulic circuit of the conventional configuration, without adding components such as a new solenoid valve for switching the shift valve of the hydraulic circuit, cooling oil can be supplied only when necessary to the shaft center of the rotation shaft of the first electric motor 11. Therefore, as shown in (a) and (b) of FIG. 3, it is possible to freely control presence/absence of shaft center cooling of the electric motor 11 (presence/absence of supply of cooling oil to the shaft center of the rotation shaft of the first electric motor 11) during traveling of the vehicle (traveling in the ECVT mode) by the power of the electric motor 11. Further, as shown in (d) of FIG. 3, when the vehicle 1 is traveling only by the power of the engine without using the electric motor 11, e.g., during high-speed cruising of the vehicle 1, it is possible to stop the supply of cooling oil to the shaft center of the rotation shaft of the first electric motor 11 to prevent shaft center cooling. As a result, since the operating resistance of the vehicle driving device and the power transmission device resulting from the oil flowing through the hydraulic circuit and its cooling oil passage L1 can be effectively reduced, it is possible to improve the fuel efficiency of the vehicle 1.

Further, in the hydraulic circuit of this embodiment, the cooling oil passage shift valve 84 switches presence/absence of supply of oil to the first shaft center cooling oil passage L12 by a hydraulic pressure of oil supplied from the second oil pump OP2 driven with rotation of the wheels 20 of the vehicle 1.

According to this configuration, a hydraulic pressure linked with the vehicle speed of the vehicle 1 can be supplied to the cooling oil passage shift valve 84. Accordingly, for example, even during high-speed traveling in which the load of the first electric motor 11 is relatively low, it is assumed that the iron loss of the first electric motor 11 increases due to the increase in the rotational speed of the first electric motor 11, and the rotor and the rotation shaft of the first electric motor 11 need to be cooled; in such a case, cooling of the first electric motor 11 can be appropriately performed. Therefore, with a simple configuration which keeps the number of parts small without adding new components to the vehicle 1, it is possible to perform shaft center cooling of the first electric motor 11 when traveling at a vehicle speed for which a necessary situation is assumed.

Further, the hydraulic circuit of this embodiment includes: a water-cooled type oil cooler 44 which cools oil flowing through the cooling oil passage L1 by cooling water of the vehicle 1; a first temperature sensor 95 which detects a temperature of oil flowing through the cooling oil passage L1; and a switching valve 46 which switches presence/absence of supply of the cooling water to the oil cooler 44 according to the detected temperature of the first temperature sensor 95. The switching valve 46 is provided in a cooling water flow path 45 connected to the oil cooler 44.

In the case where the water-cooled type oil cooler 44 which cools oil flowing through the cooling oil passage L1 by the cooling water of the vehicle 1 is provided as in the hydraulic circuit of this embodiment, if oil is constantly cooled by the cooling water, since the temperature of the oil in the hydraulic circuit will not rise easily, the operating resistance (friction) of the vehicle driving device and the power transmission device resulting from the oil flowing through the hydraulic circuit and its cooling oil passage L1 continues to be high, and there is a concern that it will hinder the improvement of fuel efficiency of the vehicle 1. In contrast, in the hydraulic circuit of this embodiment, as described above, by providing the switching valve 46 for switching presence/absence of supply of the cooling water to the oil cooler 44 according to the detected temperature of the first temperature sensor 95, cooling of oil by the oil cooler 44 may be performed only when necessary. Therefore, the operating resistance (friction) of the vehicle driving device and the power transmission device can be suppressed to a low level, and the fuel efficiency of the vehicle can be improved.

Further, the hydraulic circuit of this embodiment further includes a second temperature sensor 96 which detects a temperature of oil stored in an oil pan 51. A failure of the switching valve 46 is detected based on a difference between the detected temperatures of the first temperature sensor 95 and the second temperature sensor 96.

According to this configuration, with a failure of the switching valve 46 being detected based on a difference between the detected temperatures of the first temperature sensor 95 and the second temperature sensor 96, even if the switching valve 46 fails, the failure can be appropriately detected.

Further, in this embodiment, the first temperature sensor 95 is provided on a downstream side of the oil cooler 44 in the cooling oil passage L1.

Conventionally, the temperature of the oil supplied to the first electric motor 11 is predicted to determine whether protection control by cooling the first electric motor 11 is required. In contrast, according to the above configuration of this embodiment, by providing the first temperature sensor 95 which detects the temperature of the oil after passing through the oil cooler 44 in the cooling oil passage L1, it is possible to determine whether protection control by cooling the first electric motor 11 is required based on the detected temperature of the first temperature sensor 95. Therefore, it is possible to improve the accuracy of determining whether protection control by cooling the first electric motor 11 is required (the accuracy of estimating the magnet temperature of the first electric motor 11). Accordingly, the size of the cooling device and the like can be reduced and the configuration can be simplified, and the frequency of performing protection control of the first electric motor 11 can be reduced.

Further, in this embodiment, the first temperature sensor 95 is provided on a downstream side of the cooling oil passage shift valve 84.

According to this configuration, by providing the first temperature sensor 95 on the downstream side of the oil cooler 44 in the cooling oil passage L1 and on the downstream side of the cooling oil passage shift valve 84, it is possible to detect both a failure of the switching valve 46 and a failure of the cooling oil passage shift valve 84. Therefore, since more reliable failure detection can be performed with a simple configuration in which the number of parts is reduced, the reliability of the hydraulic circuit and the vehicle driving device can be further improved.

Although the embodiment of the disclosure has been described above, the disclosure is not limited to the above embodiment, and various modifications may be made within the scope of claims and the technical concepts described in the specification and drawings. For example, it has been shown in the above embodiment that the hydraulic circuit for a vehicle driving device includes two oil pumps, i.e., the first oil pump OP1 and the second oil pump OP2; however, the hydraulic circuit for a vehicle driving device of the disclosure may also be configured to include a single oil pump. Further, the first oil pump OP1 of the above embodiment is an oil pump driven with driving of the engine 10 which is the power source of the vehicle; however, the oil pump of the disclosure may also be an oil pump driven by another driving source such as an electric motor.

What is claimed is:

1. A hydraulic circuit for a vehicle driving device, comprising:
   an oil pump which discharges oil;
   a clutch oil passage connected to an oil chamber of a clutch provided in a power transmission path which transmits power from a power source of a vehicle to driving wheels;
   a cooling oil passage for guiding oil to a cooled portion of the vehicle;
   a pressure regulating valve which regulates a pressure of oil discharged from the oil pump;
   a shift valve which switches a path of the oil regulated by the pressure regulating valve, wherein supply of oil to the clutch oil passage and the cooling oil passage is switched by switching of the pressure regulating valve and the shift valve;
   a water-cooled type oil cooler which cools oil flowing through the cooling oil passage by cooling water of the vehicle;
   a first temperature sensor which detects a temperature of oil flowing through the cooling oil passage; and
   a switching valve which switches presence/absence of supply of the cooling water to the oil cooler according to the detected temperature of the first temperature sensor, and
   the cooling oil passage comprises:
   a shaft center cooling oil passage which supplies cooling oil to a shaft center of a rotation shaft of an electric motor mounted on the vehicle; and
   a cooling oil passage shift valve which switches presence/absence of supply of oil to the shaft center cooling oil passage.

2. The hydraulic circuit for a vehicle driving device according to claim 1, wherein the oil pump is one oil pump driven with rotation of wheels of the vehicle,
   the hydraulic circuit further comprises another oil pump driven by an engine or the electric motor, wherein the engine is the power source of the vehicle, and
   the cooling oil passage shift valve is configured to be switched by a hydraulic pressure of oil supplied from the one oil pump.

3. The hydraulic circuit for a vehicle driving device according to claim 1, comprising:
   a second temperature sensor which detects a temperature of oil stored in an oil reservoir of the vehicle; and
   a controller for detecting a failure of the switching valve,
   wherein the controller detects a failure of the switching valve based on the detected temperatures of the first temperature sensor and the second temperature sensor.

4. The hydraulic circuit for a vehicle driving device according to claim 3, wherein the first temperature sensor is provided on a downstream side of the oil cooler in the cooling oil passage.

5. The hydraulic circuit for a vehicle driving device according to claim 4, wherein the first temperature sensor is provided on the downstream side of the oil cooler in the cooling oil passage and on a downstream side of the cooling oil passage shift valve.

6. The hydraulic circuit for a vehicle driving device according to claim 1, wherein the electric motor is a driving electric motor which transmits power to the driving wheels of the vehicle.

* * * * *